US012308515B2

(12) United States Patent
Garner et al.

(10) Patent No.: US 12,308,515 B2
(45) Date of Patent: *May 20, 2025

(54) CONNECTOR DEVICE WITH ANTENNA CONNECTION

(71) Applicant: Roku, Inc., San Jose, CA (US)

(72) Inventors: Gregory Garner, Key Colony Beach, FL (US); Tito Thomas, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,328

(22) Filed: Jan. 26, 2024

(65) Prior Publication Data

US 2024/0170837 A1 May 23, 2024

Related U.S. Application Data

(63) Continuation of application No. 17/223,936, filed on Apr. 6, 2021, now Pat. No. 11,923,606, which is a (Continued)

(51) Int. Cl.
*H01Q 1/46* (2006.01)
*H01Q 1/08* (2006.01)
(Continued)

(52) U.S. Cl.
CPC ................. *H01Q 1/46* (2013.01); *H01Q 1/22* (2013.01); *H01Q 21/28* (2013.01); *H01R 27/02* (2013.01);
(Continued)

(58) Field of Classification Search
CPC .............. H01Q 1/22; H01Q 1/44; H01Q 1/46; H01Q 21/28; H01R 2107/00; H01R 2201/02;
(Continued)

(56) References Cited

U.S. PATENT DOCUMENTS 5,961,337 A 10/1999 Kordes
6,016,432 A 1/2000 Stein
(Continued)

FOREIGN PATENT DOCUMENTS

CN 102780793 B 2/2016
WO WO 2016/051091 A1 4/2016

OTHER PUBLICATIONS

"Facing Wi-F-Reality: Vendors Lie (Surprise, Surprise)", The Ruckus Room, printed from https://web.archive.org/web/20120319023556/http://www.theruckusroom.net/2012/03/fact, Mar. 20, 2012, pp. 1-4.
(Continued)

*Primary Examiner* — Robert Karacsony
(74) *Attorney, Agent, or Firm* — Sterne, Kessler, Goldstein & Fox P.L.L.C.

(57) ABSTRACT

The present disclosure described devices, components, connectors, and cables that connect an audio-visual device to an external antenna. Some embodiments describe a device connector for connecting the audio-visual device to an external cable. The device connector may include a supply port that is configured to receive power, data signals, and/or some combination of power and data from a source external to the audio-visual device. The device connector may also include an antenna port that is configured to connect the audio-visual device to an external antenna that is, for example, part of the same. Additionally, the device connector may include a detection mechanism that detects the presence of an antenna connection in the antenna port. When an antenna connection is detected, the audio-visual device may be configured to use one or more external antennas connected via the antenna connection to send and receive, e.g., WiFi signals.

19 Claims, 12 Drawing Sheets

600

Related U.S. Application Data continuation of application No. 15/455,561, filed on Mar. 10, 2017, now Pat. No. 10,971,866.

(51) Int. Cl.

| | |
|---|---|
| ***H01Q 1/22*** | (2006.01) |
| ***H01Q 21/28*** | (2006.01) |
| ***H01R 27/02*** | (2006.01) |
| ***H01R 107/00*** | (2006.01) |

(52) U.S. Cl.

CPC ......... *H01Q 1/084* (2013.01); *H01R 2107/00* (2013.01); *H01R 2201/02* (2013.01)

(58) Field of Classification Search

CPC ............ H01R 2201/18; H01R 2201/24; H01R 13/6683; H01R 27/02

See application file for complete search history.

(56) References Cited

U.S. PATENT DOCUMENTS

| | | | |
|---|---|---|---|
| 6,029,057 | A | 2/2000 | Paatelma et al. |
| 6,205,344 | B1 | 3/2001 | Demuro et al. |
| 6,212,415 | B1 | 4/2001 | Demuro et al. |
| 6,795,038 | B2 | 9/2004 | Choi |
| 9,887,497 | B1 | 2/2018 | Rajagopalan et al. |
| 11,923,606 | B2 * | 3/2024 | Garner ..................... H01Q 1/22 |
| 2003/0083097 | A1 | 5/2003 | Kim |
| 2003/0098817 | A1 | 5/2003 | Choi |
| 2008/0039160 | A1 | 2/2008 | Homer et al. |
| 2008/0084356 | A1 | 4/2008 | Korner |
| 2008/0233911 | A1 | 9/2008 | Baker et al. |
| 2011/0138428 | A1 | 6/2011 | Palm et al. |
| 2012/0182683 | A1 | 7/2012 | Schwandt et al. |
| 2016/0165304 | A1 | 6/2016 | Klarke et al. |
| 2016/0295495 | A1 | 10/2016 | Lotter et al. |
| 2017/0214118 | A1 | 7/2017 | Conan et al. |
| 2018/0241420 | A1 | 8/2018 | Nakano et al. |
| 2018/0262280 | A1 | 9/2018 | Garner et al. |

OTHER PUBLICATIONS

"IEEE 802.11ac", Wikipedia, printed from https://en.wikipedia.org/wiki/IEEE_802.11ac, page last edited Aug. 9, 2017, pp. 1-9.

"IEEE 802.11n", Wikipedia, printed from https://en.wikipedia.org/wiki/IEEE_802.11n-2009, page last edited Feb. 20, 2017, pp. 1-7.

Vanhatupa, T., Ph.D., "Wi-Fi Capacity Analysis for 802.11ac and 802.11n: Theory & Practice", Ehahau, Inc., 2015, pp. 1-21.

International Search Report and Written Opinion of the International Searching Authority directed to International Patent Application No. PCT/US2018/021705, mailed Jun. 20, 2018; 8 pages.

International Preliminary Report on Patentability directed to International Patent Application No. PCT/US2018/021705, issued Sep. 10, 2019; 7 pages.

Partial Supplementary European Search Report directed to related European Patent Application No. 18763254.2, mailed Jul. 8, 2020; 13 pages.

Extended European Search Report for Application No. 23151313.6, mailed Mar. 13, 2023, 9 pages.

* cited by examiner

300

1200

CONNECTOR DEVICE WITH ANTENNA CONNECTION

CROSS-REFERENCE TO RELATED APPLICATIONS

This application is a continuation of U.S. application Ser. No. 17/223,936, filed Apr. 6, 2021, which is a continuation of U.S. application Ser. No. 15/455,561, filed Mar. 10, 2017, issued as U.S. Pat. No. 10,971,866, both of which are entitled "CONNECTOR DEVICE WITH ANTENNA CONNECTION" are incorporated by reference herein in their entirety.

FIELD

This disclosure generally relates to audio-visual devices that are configured to attach to external antennas that, for example, are embedded in an electrical cable connected to the audio-visual device.

BACKGROUND

Recently, some consumers have opted to forego traditional cable television subscriptions in favor of, e.g., internet-based streaming services. That is, rather than having a single cable television subscription, a user may now have subscriptions to several different streaming video services that each provide access to a unique catalog of video. A user may subscribe to individual channels, services, or collections of content from many sources. Examples of these services include but are not limited to Netflix™, Hulu™, Amazon Instant Video™, HBO Go™, Showtime Anytime™, among others. Each of these services provides an end user application for receiving their unique content offerings on an end user audio-visual device such as, for example, streaming media platforms.

Such audio-visual devices may plug directly in to the video and audio inputs of a display device such as a television or computer monitor using, e.g., a High Definition Multimedia Interface (HDMI) connection. Furthermore, the audio-visual devices may receive content from the internet using, e.g., a wireless connection such as WiFi according to the IEEE 802.11 standard. Accordingly, audio-visual devices may require the use of one or more antennas to receive wireless internet information. Generally, antennas function better the farther away they can be placed from other, potentially interfering, components (e.g., HDMI components) of the audio-visual device. However, because current device standards limit the physical size of audio-visual devices that plug directly into certain kinds of ports, the ability to distance antenna components of the audio-visual device is limited.

BRIEF SUMMARY

Various embodiments of the disclosure relate to devices, connectors, and cables that connect an audio-visual device (or other electrical device or component) to an external antenna. Some embodiments are directed to a device connector for connecting the audio-visual device to an external cable. The device connector may include a port that is configured to receive power from a source external to the audio-visual device. The port may also or instead be configured to receive data signals from an external source in some embodiments. For example, in some instances, the port could comprise a universal serial bus (USB) port or an HDMI port. The device connector may also include an antenna port that is configured to connect the audio-visual device to an external antenna that is, for example, part of the same cable to which the USB or HDMI port is connected. Additionally, the device connector may include a detection mechanism that detects the presence of an antenna connection in the antenna port. When an antenna connection is detected, the audio-visual device may be configured to use one or more external antennas connected via the antenna connection to send and receive, e.g., WiFi signals. In some embodiments, the audio-visual device may be configured to use the one or more external antennas instead of an internal antenna. Alternatively, in some embodiments, the audio-visual device may be configured to use the one or more external antennas in conjunction with an antenna that is internal to the audio-visual device.

Some embodiments of the disclosure also relate to a streaming media device. The streaming media device may include an audio-visual device portion, a cable portion that includes a power and/or data supply line and one or more antennas, and a device connector configured to connect the cable portion to the audio-visual device portion. In some embodiments, the audio-visual portion, the cable portion, and the device connector may form a unitary body. However, in some embodiments, the audio-visual portion, the cable portion, and the device connector may be detachably connectable. In such embodiments, the device connector may include a detection mechanism that detects the presence of an antenna connection in the antenna port. When an antenna connection is detected, the audio-visual device may be configured to use one or more external antennas connected via the antenna connection to send and receive, e.g., WiFi signals. In some embodiments, the audio-visual device may be configured to use the one or more external antennas instead of an internal antenna. Alternatively, in some embodiments, the audio-visual device may be configured to use the one or more external antennas in conjunction with an antenna that is internal to the audio-visual device.

Some embodiments of the disclosure also include a cable for use with a streaming media device. The cable may include a power and/or data supply line, an antenna, and a connection portion. In various embodiments, the connection portion may be coupled to the power and/or data supply line and the antenna both. Additionally, the connection portion may also include a separate antenna connector that is electrically coupled to the antenna and a power and/or data supply connector that is electrically coupled to the power and/or data supply line. The connection portion, in some embodiments, may also further comprise an additional antenna connector that is electrically coupled to an additional antenna. Both antennas may be physically offset from one another in various embodiments.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
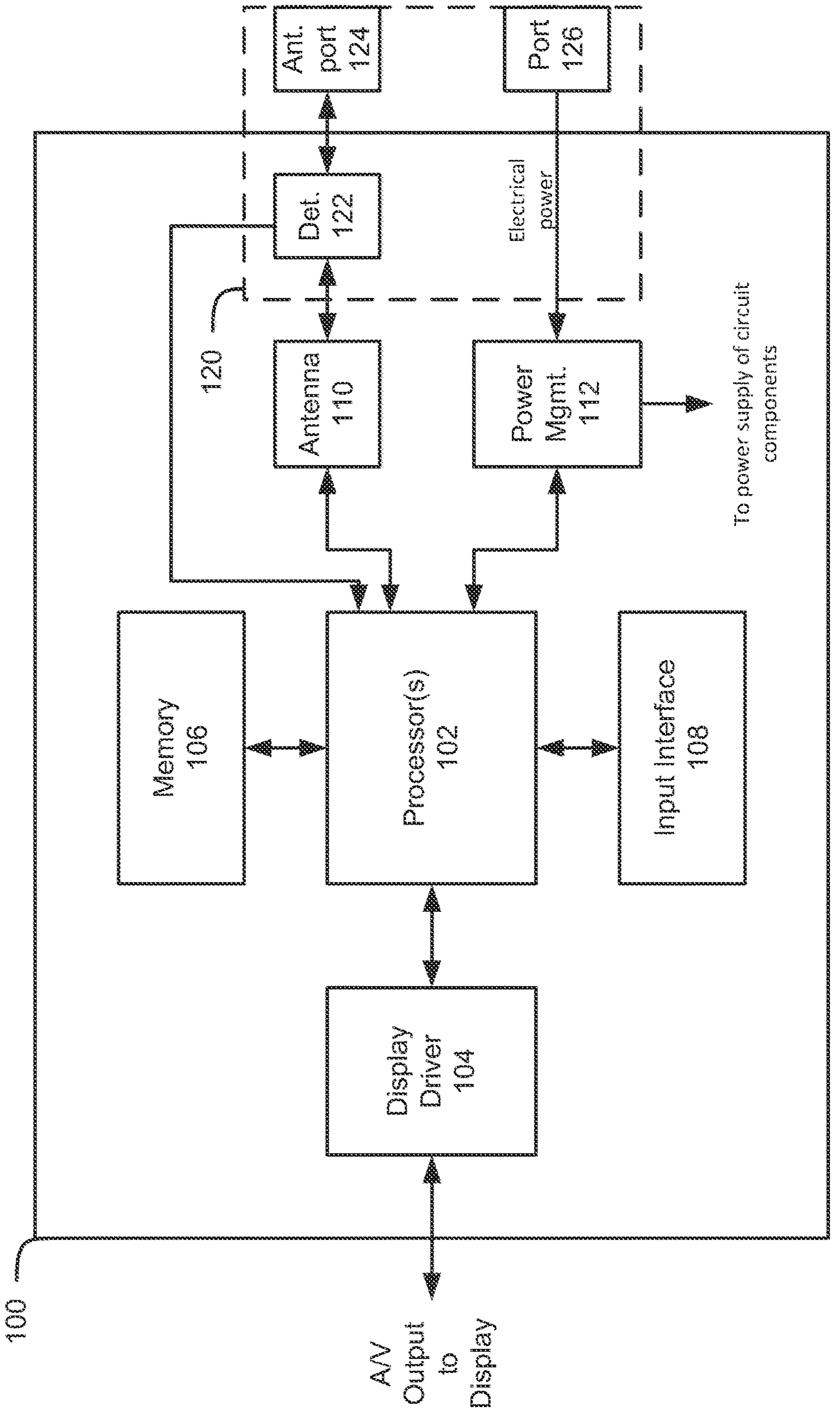
FIG. 1 is a block diagram of an example audio-visual device according to various embodiments.

As discussed above, the present disclosure includes various embodiments that relate to devices, components, connectors, and/or cables that connect an audio-visual device (or other electrical device) to an external antenna. FIG. 1 is a block diagram depicting an example audio-visual device 100 according to various embodiments. As shown in FIG. 1, display device 100 may include one or more processors 102, a display driver 104, memory 106, and an input interface 108. Additionally the audio-visual device may include an antenna module 110 and a power management module 112.

The display driver 104 of the audio-visual device 100 may be configured to output audio-visual (A/V) output to, e.g., a display device such as a television, phone, tablet, computer, monitor, or the like. The display driver 104 may operate under the control of processor 102 and may be configured to output A/V content via, e.g., a HDMI connection to the display (not shown).

Memory 106 may comprise any appropriate memory storage device and may be configured to store a number of different kinds of information. For instance, in some embodiments, memory 106 may be configured to store a number of different streaming media applications for execution by processor 102 in either a compiled or un-compiled form.

The interface 108 may be configured to accept user input from, for example, a remote control device (not shown). In some embodiments, the interface 108 may include a wireless sensor (e.g., an infrared sensor) to communicate with a remote control device and to convey user input from the remote control device to the processor 102.

The power management module 112 of audio-visual device 100 may be configured to receive electrical power from an external supply and to provide power to the various other components of the audio-visual device 100. For instance, as shown in FIG. 1, the power management module 112 receives electrical power from port 126 and distributes the electrical power to the various components of the audio-visual device 100. Additionally, the power management module 112 may be controlled by processor 102 to, for instance, adjust the amount of power to various components or to power on and off various components of audio-visual device 100.

The antenna module 110 may contain one or more antennas that are configured to establish a wireless connection with a remote wireless signal source such as, a wireless internet router, a Bluetooth device, or a radio device, to name a few non-limiting examples. The antenna module 110 may comprise one or more individual antenna integrated circuit components. In some embodiments, the antenna module 110 may include antenna elements directly printed on a printed circuit board of audio-visual device 100.

As shown in FIG. 1, the audio-visual device 100 may also include a device connector 120. The device connector 120 may include a detection circuit 122, an antenna port 124, and a port 126. As discussed above, port 126 may be configured to receive power from a source external to the audio-visual device 100. However, port 126 may also or instead be configured to receive data signals from a source external to the audio-visual device. The port 126 can be configured to provide the received electrical power to the power management module 112, where the electrical power may be distributed to the various portions of audio-visual device 100. In some instances, the power supply port could be any appropriate standard connection port such as a universal serial bus (USB) port, micro USB port, an AC adaptor plug, and a coaxial port, to name a few non-limiting examples.

The device connector 120 may also include an antenna port 124 that is configured to connect the audio-visual device 100 to an external antenna that may be, in some embodiments, part of the same cable to which port 126 is connected. According to various embodiments, the electrical cable that connects to device connector 120 may comprise an HDMI cable, a USB cable, a micro USB cable, power cable, or any suitable cable that is capable of transmitting power and/or data signals. Furthermore, in some embodiments, one or more external antennas may be embedded in the cable along the length and/or diameter of the cable and be available for use by the audio-device 100 when they are connected to the antenna port 124. Additionally, the device connector 120 may include a detection mechanism 122 that detects the presence of an antenna connection in the antenna port 124. When an antenna connection is detected, the audio-visual device 100 may be configured to use one or more external antennas connected via the antenna port 124 to send and receive, e.g., wireless signals. In some embodiments, the audio-visual device 100 may be configured to use the one or more external antennas instead of an internal antenna 110. Alternatively, in some embodiments, the audio-visual device 100 may be configured to use the one or more external antennas in conjunction with antenna module 110. Alternatively, in some embodiments, the audio-visual device 100 may not include antenna module 110, instead relying on external antennas for wireless connectivity and communication.

In some embodiments, the detection mechanism 122 may send a signal to processor 102 indicating the presence or non-presence of an antenna connection at antenna port 124. The processor 102 may then electrically connect or disconnect the internal antenna 110 from operation in favor of one or more external antennas (e.g., antennas embedded in a cable connected to the antenna port) connected to antenna port 124 depending on the particular embodiment. However, in other embodiments, the detection mechanism 122 may be implemented as a physical switch that connects or disconnects the antenna module 110 in favor of one or more external antennas connected to antenna port 124.

Figure 2:
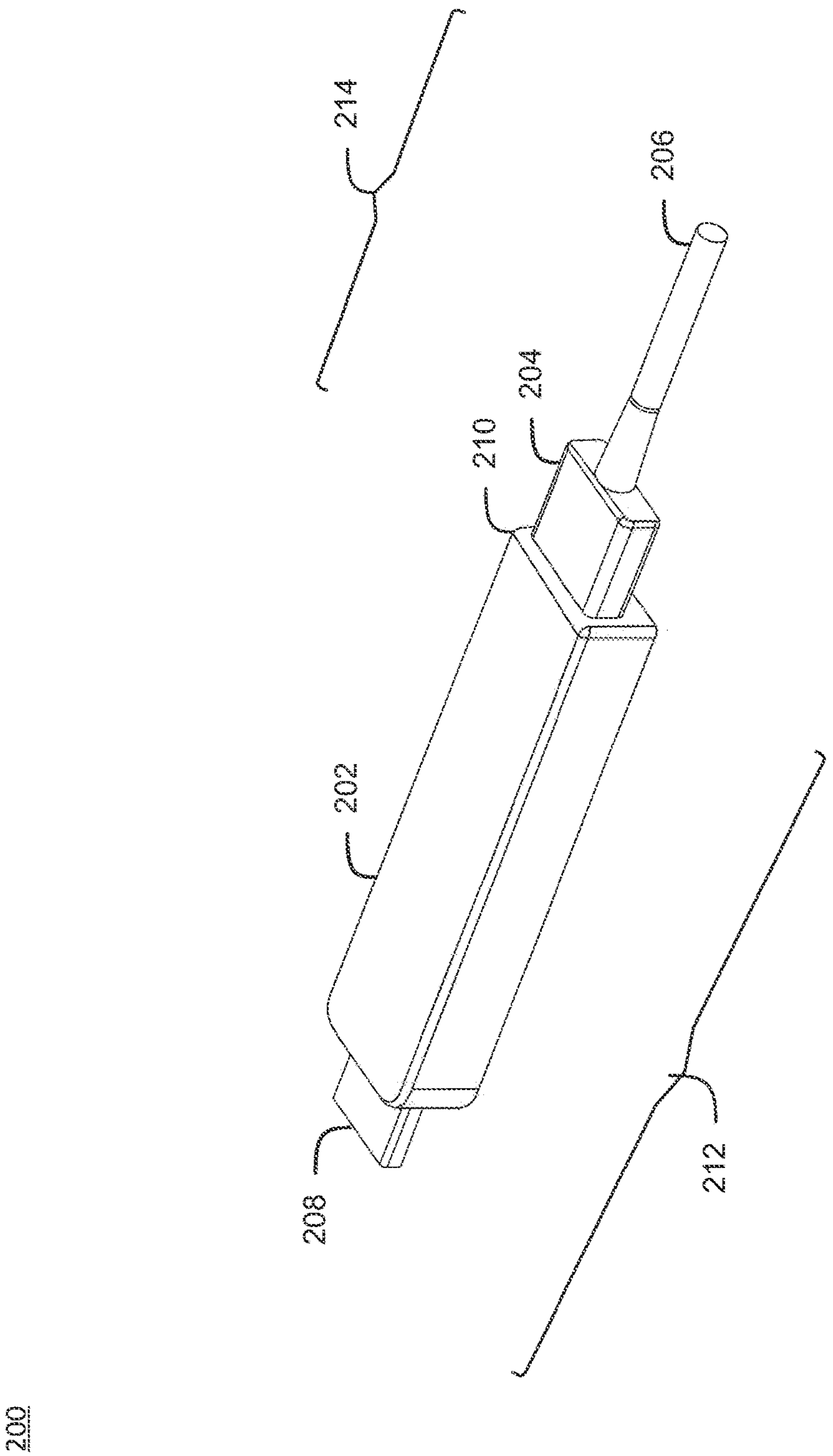
FIG. 2 depicts an audio-visual device connected to a cable via a connector according to various embodiments.

FIG. 2 is an illustration of a streaming media device 200 according to various embodiments of the disclosure. As shown in FIG. 2, the streaming media device 200 may include an audio-visual device portion 212 and a cable portion 214. In some embodiments, the audio-visual device portion 212 may be similar to audio-visual device 100 from FIG. 1. However, FIG. 2 should not be construed as so limiting.

The audio-visual device portion 212 may itself comprise audio-visual device 202 and an A/V connector 208. While FIG. 2 depicts A/V connector 208 as an HDMI connector, other embodiments may utilize different A/V connectors such as component connectors, optical connectors, USB connectors, micro USB connectors, coaxial connectors, video graphics array (VGA) connectors, digital visual interface (DVI) connectors, to name several non-limiting examples.

The cable portion 214 may itself comprise a connector 204 and a cable 206. The connector 204 may operate to connect to the audio-visual device portion 212 via device connection 210 (corresponding to device connector 120 in FIG. 1, for example). In some embodiments, device connection 210 may be a permanent connection and the audio-visual portion 212 and the cable portion 214 may form a single unitary body. However, in some embodiments the device connection 210 forms a detachable connection between the audio-visual portion 212 and the cable portion 214.

The cable 206 of cable portion 214 may connect the connector 210 (and by extension the audio-visual device portion 212) to a power supply, a data signal source, and/or one or more external antennas. In some embodiments, the cable 206 may comprise a modified standard cable (e.g., a USB or HDMI cable) that also includes antenna elements connected and extending along various points. In some embodiments, the connector 204 may contain external antenna elements for connection to the audio-visual device portion 212.

Figure 3:
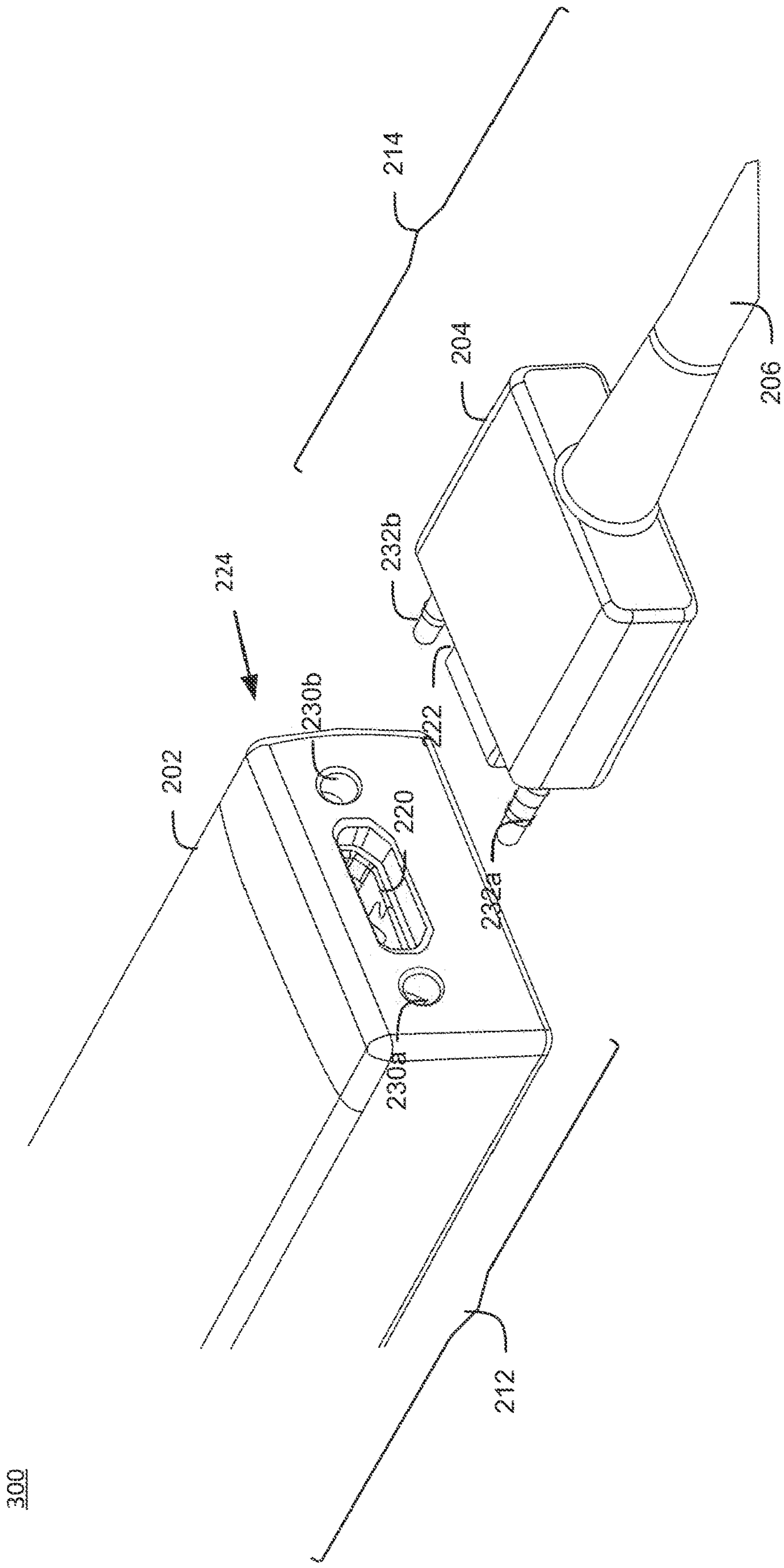
FIG. 3 depicts an audio-visual device unconnected from a cable via a connector according to various embodiments.

FIG. 3 illustrates a portion of streaming media device 300 similar to the streaming media system illustrated in FIG. 2. As shown in FIG. 3, the streaming media device 300 contains an audio-visual device portion 212 and a cable portion 214. In some embodiments, the audio-visual device portion 212 may be similar to audio-visual device 100 from FIG. 1. However, FIG. 3 should not be construed as so limiting.

The streaming media device 300 in FIG. 3 is shown with the audio-visual device portion 212 detached from the cable portion 214. Each of the audio-visual portion 212 and the cable portion 214 has a corresponding connector portion. For instance, in the example of FIG. 3, the audio-visual device portion 212 has a female connector portion 224 with ports for receiving the connectors from male the male connector portion 204 of the cable portion 214.

The connector portion 224 of the audio-visual portion 212 is shown as having antenna connection ports 230*a* and 230*b* and a connection port 220. In some embodiments, connection port 220 may provide power, data signals, and/or some combination of power and data signals to the audio-visual portion. While FIG. 3 depicts connection port 220 as a USB port, this is just one example of a possible kind of port that may be used. Any suitable port capable of carrying electrical power and/or data signals may be used. In some embodiments, the antenna connection ports 230*a* and 230*b* may correspond to antenna port 124 shown in FIG. 1. Similarly, the USB port 220 may correspond to port 126.

The connector 204 of the cable portion 214 includes male antenna connectors 232*a* and 232*b* and male connector 222. Male antenna connectors 232*a* and 232*b* are configured to mate with antenna ports 230*a* and 230*b*, respectively, of the connector portion 224. Additionally, male connector 222 is configured to mate with port 220 in connector 224.

Each of the antenna connectors 232*a* and 232*b* may be electrically connected to an external antenna that, for example, forms part of cable 206. That is, the connectors 232*a* and 232*b* may electrically connect one or more antennas that are embedded in cable 206 along its length. However, in some embodiments, one or more external antennas may be part of connector 204.

Figure 4:
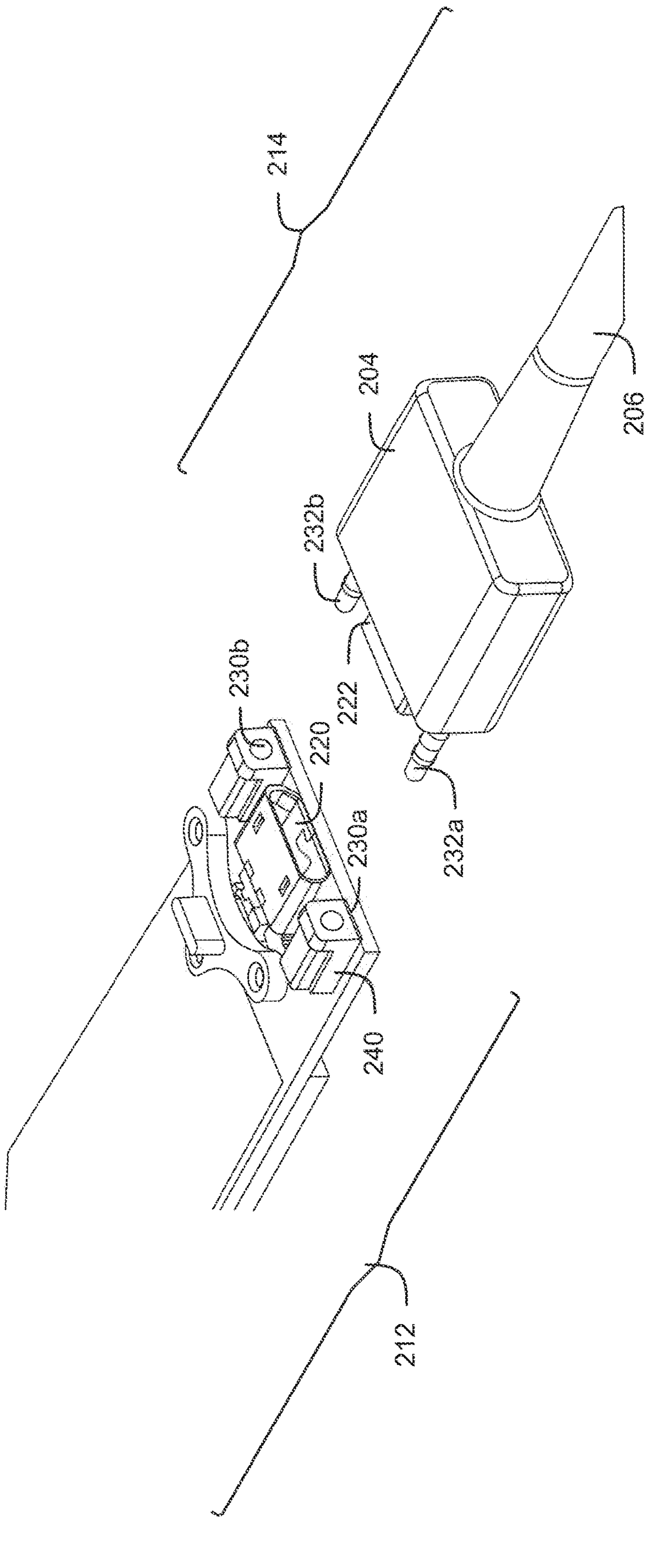
FIG. 4 depicts an audio-visual device unconnected from a cable via a connector according to various embodiments.

FIG. 4 illustrates a portion of an internal configuration of streaming media device 300 similar to the streaming media system illustrated in FIG. 3 with the cover of the audio-visual device portion 212 removed. As shown in FIG. 4, the streaming media device 300 contains an audio-visual device portion 212 and a cable portion 214. In some embodiments, the audio-visual device portion 212 may be similar to audio-visual device 100 from FIG. 1. However, FIG. 4 should not be construed as so limiting.

As shown in FIG. 4, each of the audio-visual portion 212 and the cable portion 214 has a corresponding connector portion. For instance, the audio-visual device portion 212 has a female connector portion 224 with ports for receiving the connectors from male the male connector portion 204 of the cable portion 214.

The connector portion 224 of the audio-visual portion 212 is shown as having antenna connection ports 230*a* and 230*b* and a port 220. According to various embodiments, port 220 may comprise a USB port, a micro USB port, an HDMI port, a power port, or any suitable port that can transmit power, data signals, and/or some combination of power and data signals. In some embodiments, the antenna connection ports 230*a* and 230*b* may correspond to antenna port 124 shown in FIG. 1. Similarly, the USB port 220 may correspond to port 126.

The connector 204 of the cable portion 214 includes male antenna connectors 232*a* and 232*b* and male USB connector 222. Male antenna connectors 232*a* and 232*b* are configured to mate with antenna ports 230*a* and 230*b*, respectively, of the connector portion 224. Additionally, male connector 222 is configured to mate with port 220 in connector 224.

Each of the antenna connectors 232*a* and 232*b* may be electrically connected to an external antenna that, for example, forms part of cable 206. However, in some embodiments, the external antenna may be part of connector 204.

FIG. 4 also shows that the audio-visual device portion 212 contains an internal antenna module 240. In various embodiments, when connectors 232*a* and 232*b* are connected with ports 230*a* and 230*b*, the audio-visual device portion 212 may be configured to bypass the internal antenna module 240 and use, instead, one or more external antennas that are connected via connectors 232*a* and 232*b*. In some embodiments, the audio-visual device portion 212 may also be configured to use the internal antenna module 240 in conjunction with one or more external antennas that are connected via connectors 232*a* and 232*b*.

Figure 5:
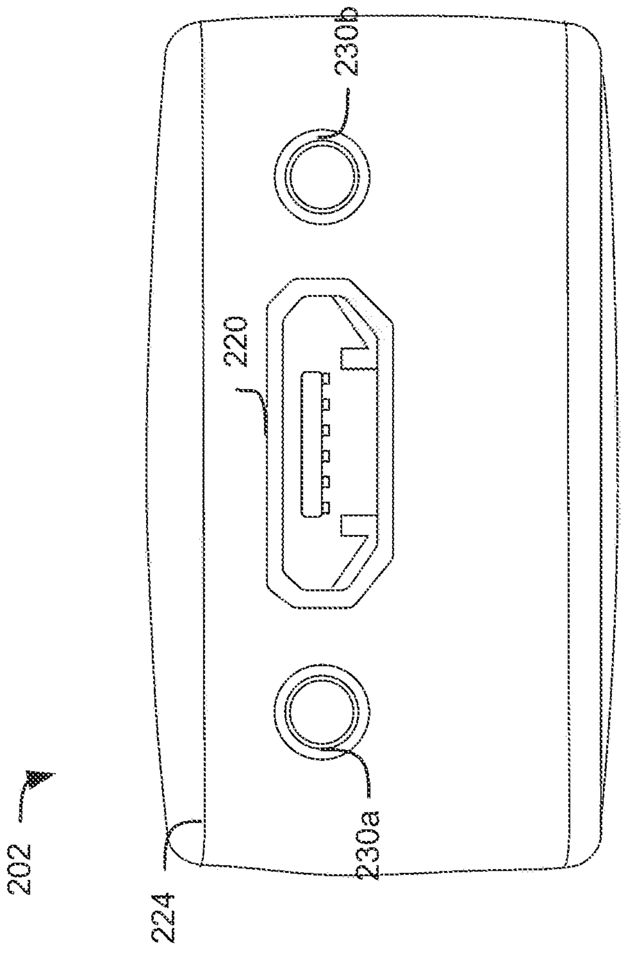
FIG. 5 depicts connection ports of an audio-visual device according to various embodiments.

FIG. 5 depicts a connector portion 224 of an audio visual device 202 according to various embodiments of the disclosure. As shown, the connector portion 224 may include a connector port 220. According to various embodiments connector port 220 may be a USB port, a micro USB port, and HDMI port, or any suitable port capable of carrying electrical power, data signals, and/or some combination of electrical power and data signals. Ports 230*a* and 232*b* are configured to receive antenna connectors (e.g., connectors 232*a* and 232*b*). In some embodiments, ports 232*a* and 232*b* may be configured to receive co-axial type connectors. However, any suitable antenna connector may be employed consistent with this disclosure.

Figure 6:
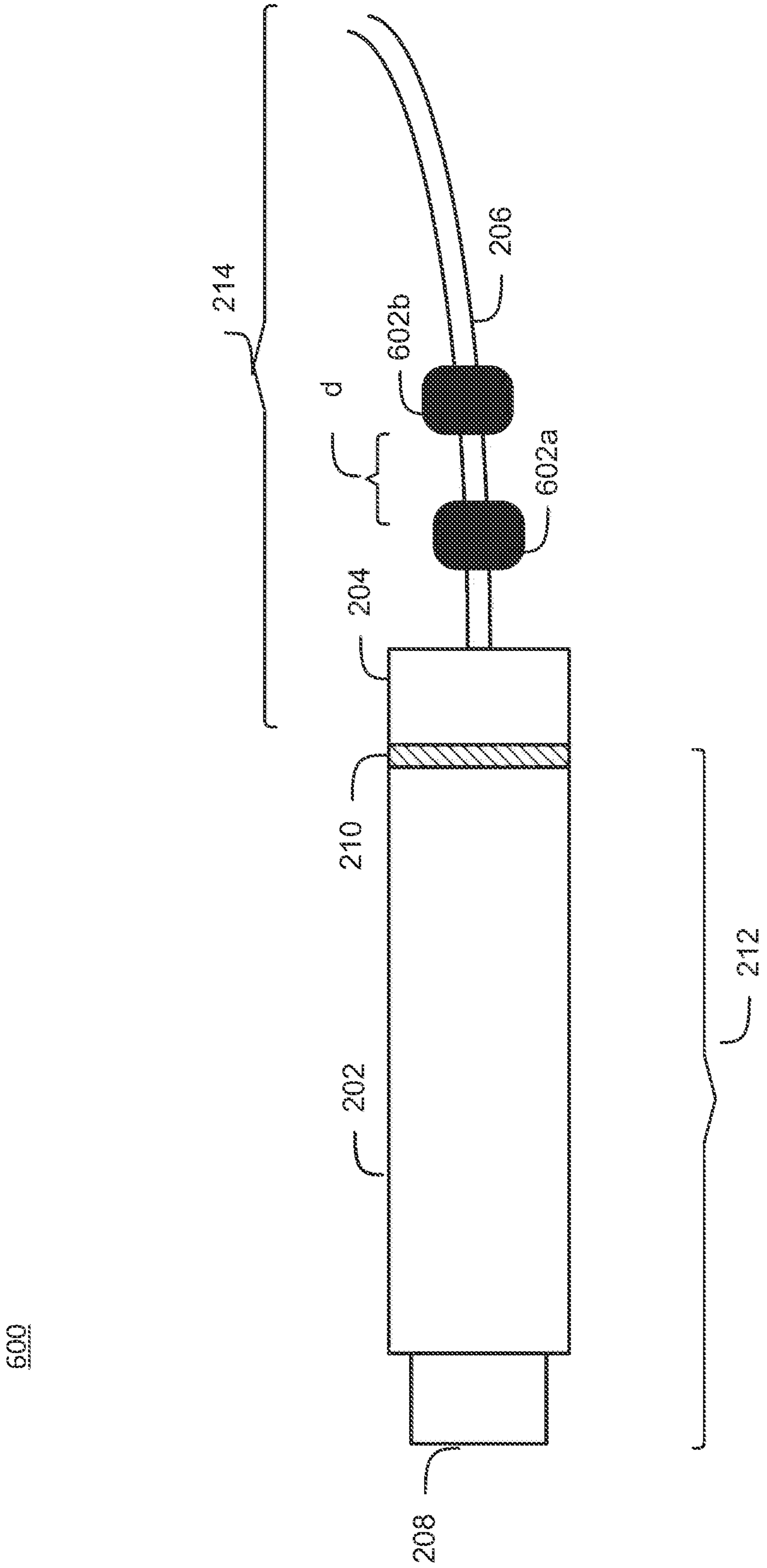
FIG. 6 depicts an audio-visual device connected to a cable having external antenna components according to various embodiments.

FIG. 6 depicts a block diagram of a streaming media device 600 according to various embodiments of the disclosure. As shown in FIG. 6, the streaming media device 600 may include an audio-visual device portion 212 and a cable portion 214 similar to the corresponding elements described with respect to FIG. 2, above. However, FIG. 6 should not be construed as so limiting.

The audio-visual device portion 212 may itself comprise audio-visual device 202 and an A/V connector 208 such as an HDMI connector, component connectors, optical connectors, USB connectors, micro USB connectors, coaxial connectors, video graphics array (VGA) connectors, digital visual interface (DVI) connectors, to name several non-limiting examples.

The cable portion 214 may itself comprise a connector 204 and a cable 206. The connector 204 may operate to connect to the audio-visual device portion 212 via device connection 210. In some embodiments, device connection 210 may be a permanent connection and the audio-visual portion 212 and the cable portion 214 may form a single unitary body. However, in some embodiments the device connection 210 forms a detachable connection between the audio-visual portion 212 and the cable portion 214.

The cable 206 of cable portion 214 may connect the connector (and by extension the audio-visual device portion 212) to a power supply, a data signal source, some combination of power supply and a data source, and/or one or more external antennas. In some embodiments, the cable 206 may comprise a modified standard cable (e.g., a USB cable) that also includes antenna elements connected along various points. In some embodiments, the connector 204 may contain external antenna elements for connection to the audio-visual device portion 212.

In some embodiments, the cable portion 214 of the streaming media device 600 also contains one or more external antennas 602*a* and/or 602*b*. Specifically, in some embodiments, the external antennas 602*a* and 602*b* are integrated as part of the cable 206 and may be connected to the audio-device portion 212 by, e.g., connectors such as connectors 232*a* and 232*b*. According to some embodiments, the external antennas 602*a* and 602*b* may linearly offset from each other by a distance d equal to a fraction or multiple of the wavelength of the carrier signal frequency. In some embodiments, antennas 602*a* and 602*b* are linearly offset from each other such that distance d is around ¼ of the wavelength of the frequency. For instance, if the carrier signal frequency is 2.4 GHz (i.e., one of the frequencies used by the IEEE 802.11 standard), then the linear offset distance d may be around 31.25 mm, or ¼ of the 12.5 cm wavelength. The following table lists example offset distances by frequency for some example embodiments of the disclosure:

| Frequency | Wavelength | Offset Distance d |
|---|---|---|
| 2.4 GHz | 12.5 cm | 31.25 mm |
| 3.6 GHz | 8.33 cm | 20.83 mm |
| 4.9 GHz | 6.12 cm | 15.3 mm |
| 5 GHz | 6.0 cm | 15 mm |
| 5.9 GHz | 5.08 cm | 12.7 mm |

For example, as shown in the above table, at a frequency of 3.4 GHz, the offset distance d may be around a quarter of the wavelength 12.5 cm, or 31.25 mm. At a frequency of 3.6 GHz, the offset distance d may be around a quarter of the wavelength 6.12 cm, or 15.3 mm. At a frequency of 4.9 GHZ, the offset distance d may be around a quarter of the wavelength 6.12 cm, or 15.3 mm. At a frequency of 5 GHZ, the offset distance d may be around a quarter of the wavelength 6.0 cm, or 15 mm. At a frequency of 5.9 GHZ, the offset distance d may be around a quarter of the wavelength 5.08 cm, or 12.7 mm.

In some embodiments, not shown in FIG. 6, external antennas may be contained within cable 206, and may extend along the internal diameter and/or length (to some extent) of cable 206.

Figure 7:
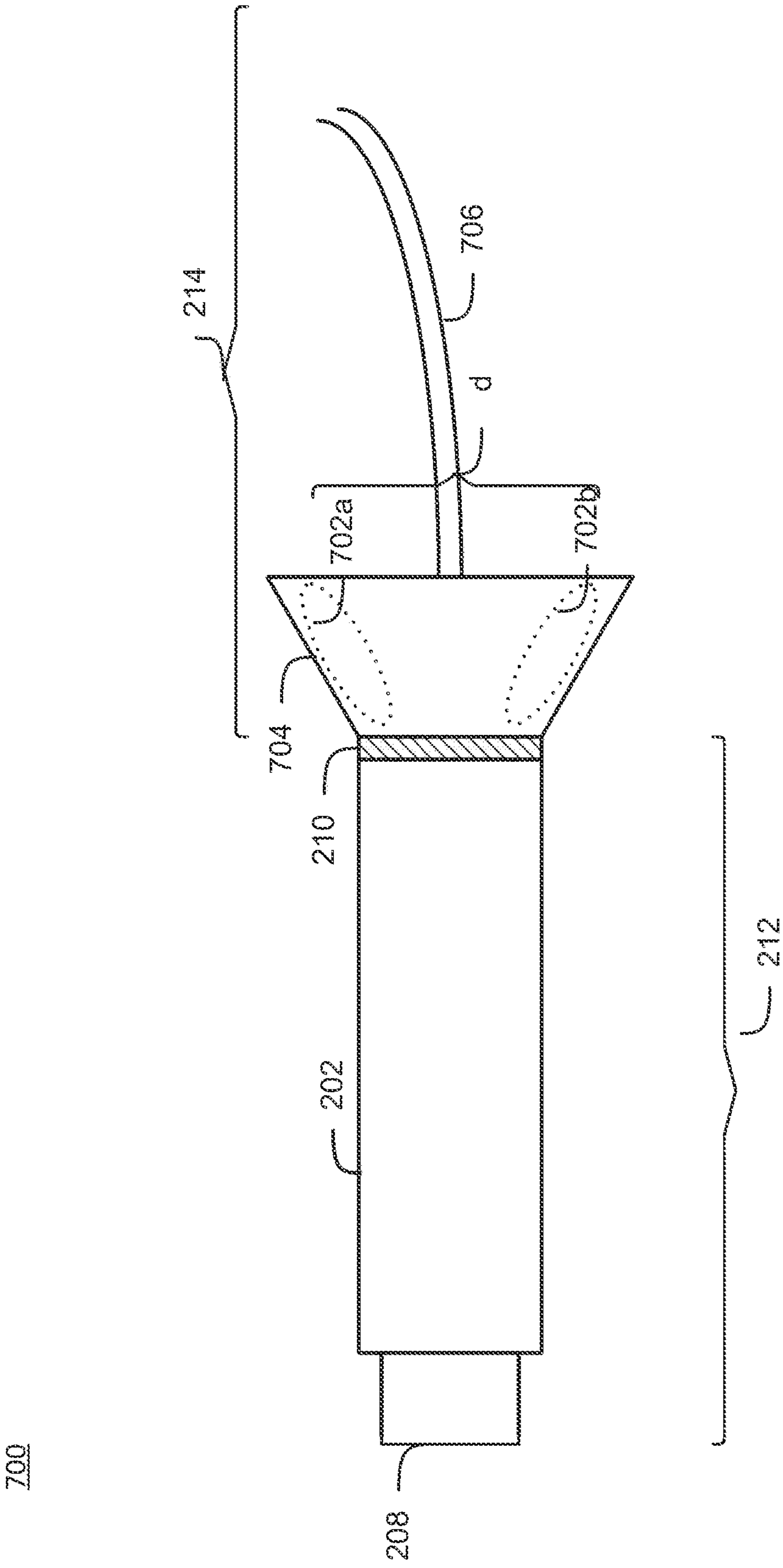
FIG. 7 depicts an audio-visual device connected to a cable having external antenna components according to various embodiments.

FIG. 7 depicts a block diagram of a streaming media device 700 according to some embodiments of the disclosure. Streaming media device 700 is similar to the streaming media devices described with respect to FIGS. 2 and 6, above. That is, streaming media device may include an audio-visual device portion 212 and a cable portion 214 similar to the corresponding elements described with respect to FIGS. 2 and 6, above. The streaming device 700 of FIG. 7, however, differs from other embodiments in that it has external antennas 702*a* and 702*b* embedded in a modified connector portion 704. As shown in FIG. 7, the connector portion may be shaped to allow external antennas 702*a* and 702*b* to be offset from each other by a distance d at an angle. Similarly to the embodiment shown in FIG. 6, external antennas 702*a* and 702*b* may be offset such that the distance d between them is a fraction or multiple of the wavelength of the carrier signal that the antennas 702*a* and 702*b* are designed to transmit and receive. For instance, in some embodiments, distance d may be around ¼ of the wavelength of the carrier signals.

Figure 8:
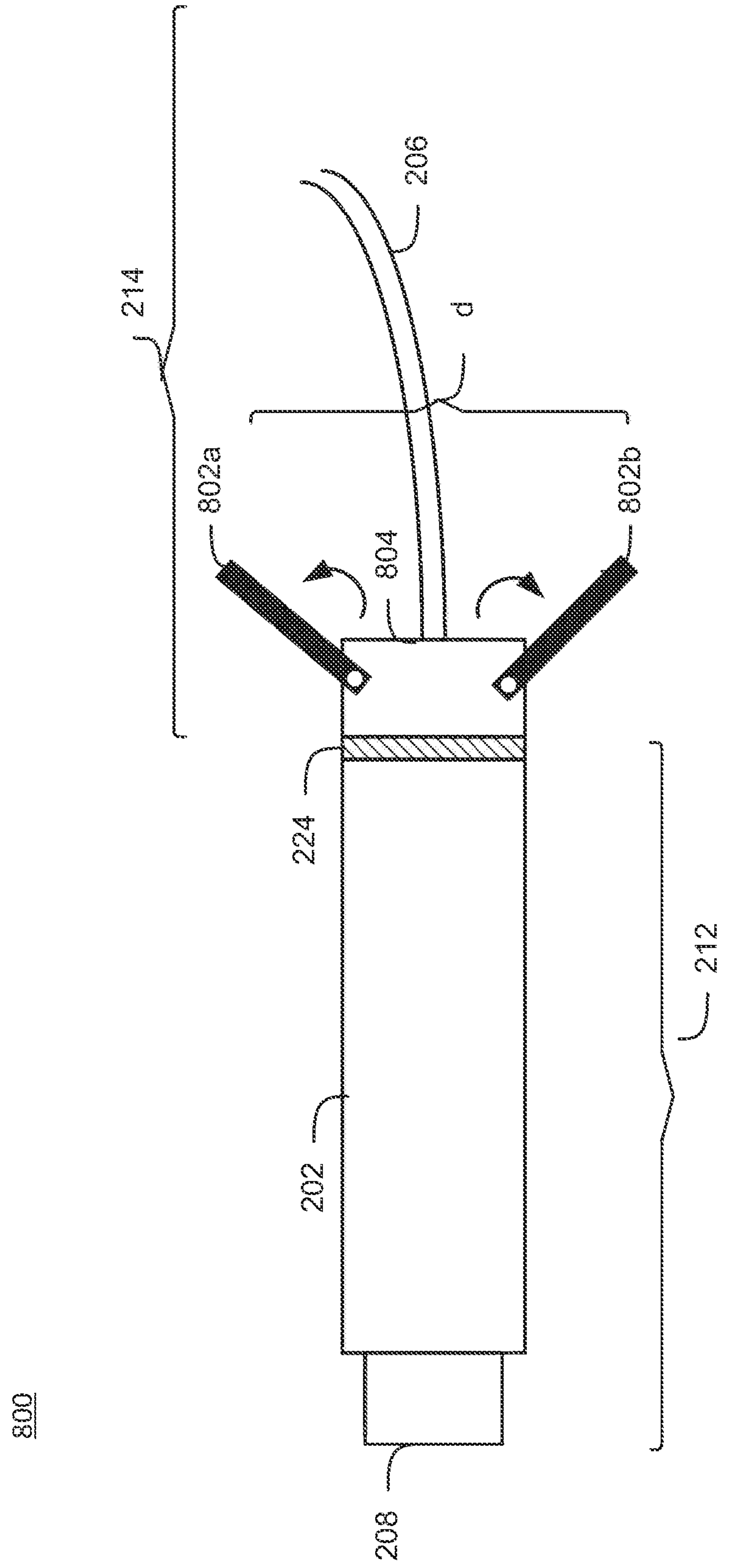
FIG. 8 depicts an audio-visual device connected to a cable having external antenna components according to various embodiments.

FIG. 8 depicts a block diagram of a streaming media device 800 according to some embodiments of the disclosure. Streaming media device 800 is similar to the streaming media devices described with respect to FIGS. 2, 6, and 7, above. That is, streaming media device may include an audio-visual device portion 212 and a cable portion 214 similar to the corresponding elements described with respect to FIGS. 2, 6, and 7, above. The streaming device 800 of FIG. 8, however, differs from other embodiments in that it has external antennas 802*a* and 802*b* that are externally connected to in a modified connector portion 804. As shown in FIG. 8, the connector portion 804 may allow antennas 802*a* and 802*b* to by physically moved to a deployed position such that they become offset from each other by a distance d at an angle. Similarly to the embodiments shown in FIGS. 6 and 7, external antennas 802*a* and 802*b*, when deployed, may be offset such that the distance d between them is a fraction or multiple of the wavelength of the carrier signal that the antennas 802*a* and 802*b* are designed to transmit and receive. For instance, in some embodiments, distance d may be around ¼ of the wavelength of the carrier signals.

Figure 9:
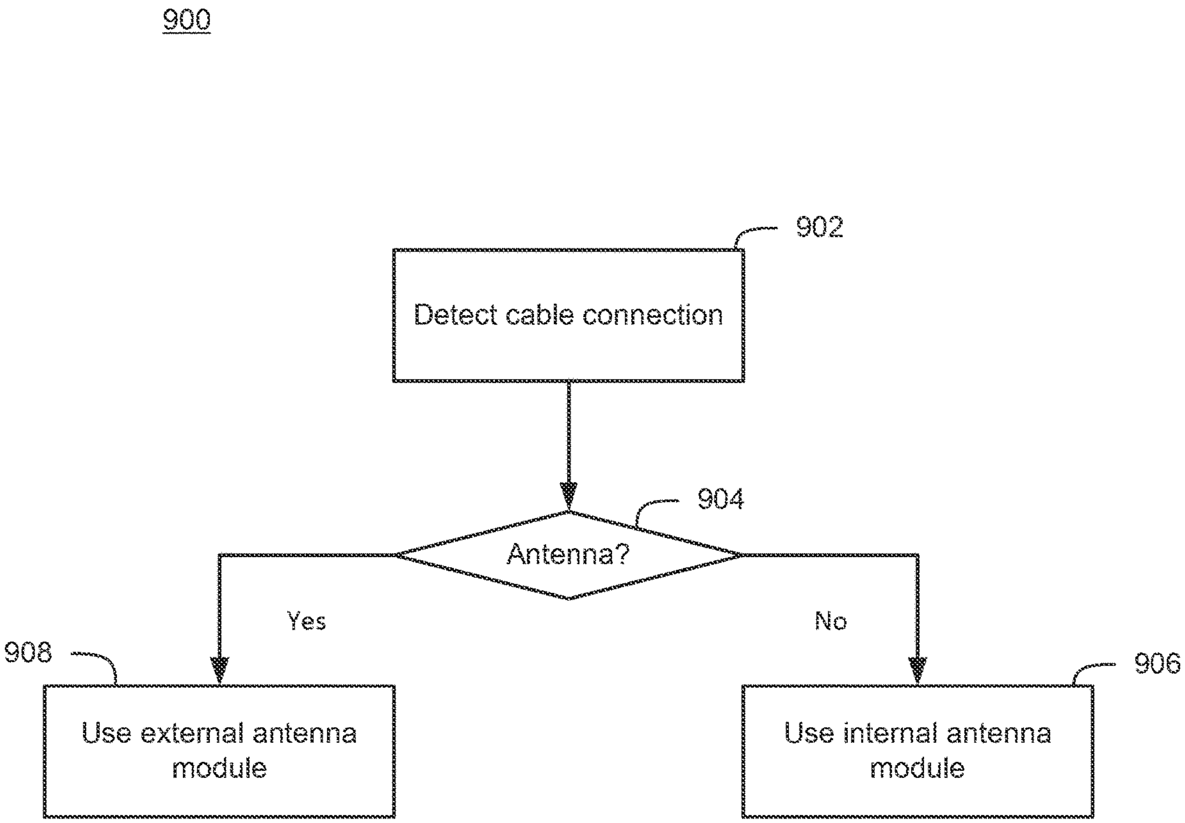
FIG. 9 is a flowchart depicting a method of detecting the presence of an external antenna according to various embodiments.

As noted above, the device connector 120 may include detection circuitry (e.g., detection circuit 122) that is configured to detect whether an antenna connector is present at antenna port 124. This allows a user the flexibility of using, e.g., a standard connection cable (e.g., USB or HDMI) to connect to audio-visual device 100 or to use a modified cable (e.g., cable 204) that contains external antennas. When a standard cable is used, the detection circuit 122 will not detect the presence of an antenna connector at the antenna port and the audio-visual device 100 can be configured to use its internal antenna module. However, when a modified cable with one or more antenna connectors is detected by the detection circuit 122, then the audio-visual device 100 can be configured to use one or more external antennas either in conjunction with the internal antenna module 110 or instead of the internal antenna module 110. FIG. 9 is a flowchart illustrating this method 900 of detection.

As shown in FIG. 9, method 900 begins at 902 with the connection of a cable (e.g. cable 206) to a port (e.g., port 220) of the audio-visual device portion 212. Upon detection of the presence of the cable, a detection circuit (e.g., detection circuit 122) may detect whether an antenna connection (e.g., antenna connector 232*a* or 232*b*) is present in one or more antenna ports (e.g., ports 230*a* or 230*b*) at 904. In some embodiments, detecting the presence of an antenna connection from the cable may include detecting a signal and transmitting the signal to the processors 102. Additionally, in some embodiments, detecting the presence of an antenna connection may include detecting that one or more physical switches has been tripped by the insertion of an antenna connector (e.g., connectors 232*a* or 232*b*) into one or more antenna ports (e.g., ports 230*a* and 230*b*).

If, at 904, the presence of an antenna connection is not detected, then the method 900 proceeds to 906 and the audio-visual device 100 can be configured to conclude that the cable connection is a standard cable connection and the internal antenna module (e.g., antenna module 110) can be used. If, however, at 904 an antenna connection is detected, then the method 900 may proceed to 908 and the audio-visual device 100 can be configured to use external antennas connected via the antenna connection. In some embodiments, the audio-visual device 100 may be configured to use one or more external antennas in conjunction with the internal antenna module (e.g., antenna module 110). However, the audio-visual device 100 may also be configured to use one or more external antennas instead of the internal antenna module in some embodiments.

Detection circuitry may be implemented using any combination of hardware and/or software configured to operate as shown in FIG. 9.

In the embodiment shown in FIG. 1, processor 102 may be configured to enable and perform wireless connectivity and communication using the antenna module 110 and/or any external antennas according to any wireless communication standard, methodology or technology, including but not limited to any WIFI, cellular and/or short range communication standard, methodology or technology. In some embodiments, however, such wireless communication functionality is positioned external to the audio-visual device 100.

Figure 10:
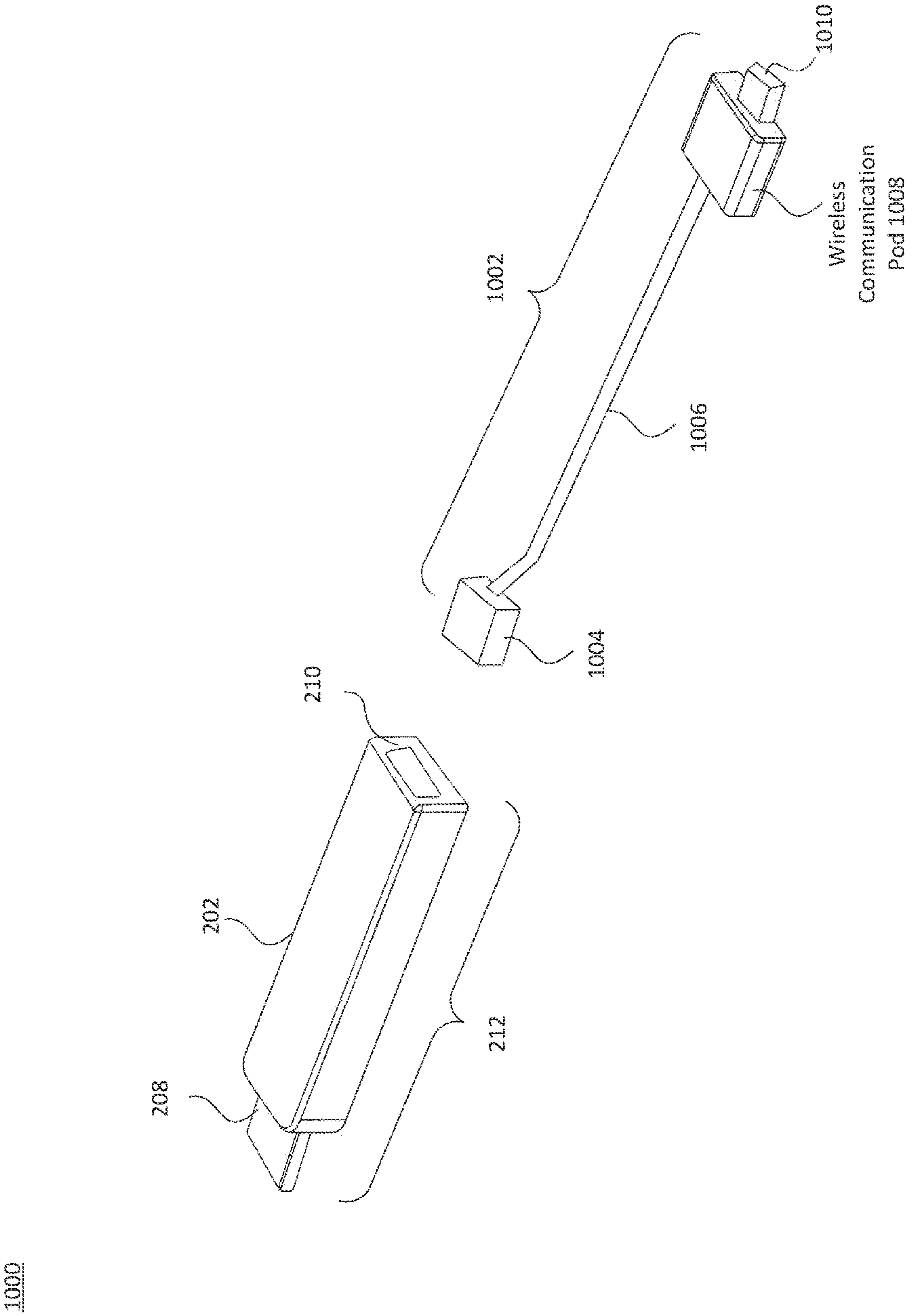
FIGS. 10 and 12 illustrate other example embodiments of a cable.

For example, FIG. 10 illustrates an example streaming media device 1000 having audio-visual device portion 212 and cable portion 1002, according to some embodiments. FIG. 10 is generally similar to FIG. 2. However, in the example of FIG. 10, cable portion 1002 includes a wireless communication pod 1008 proximate to or combined with connector 1010, which may be a USB connector in some embodiments.

Figure 11:
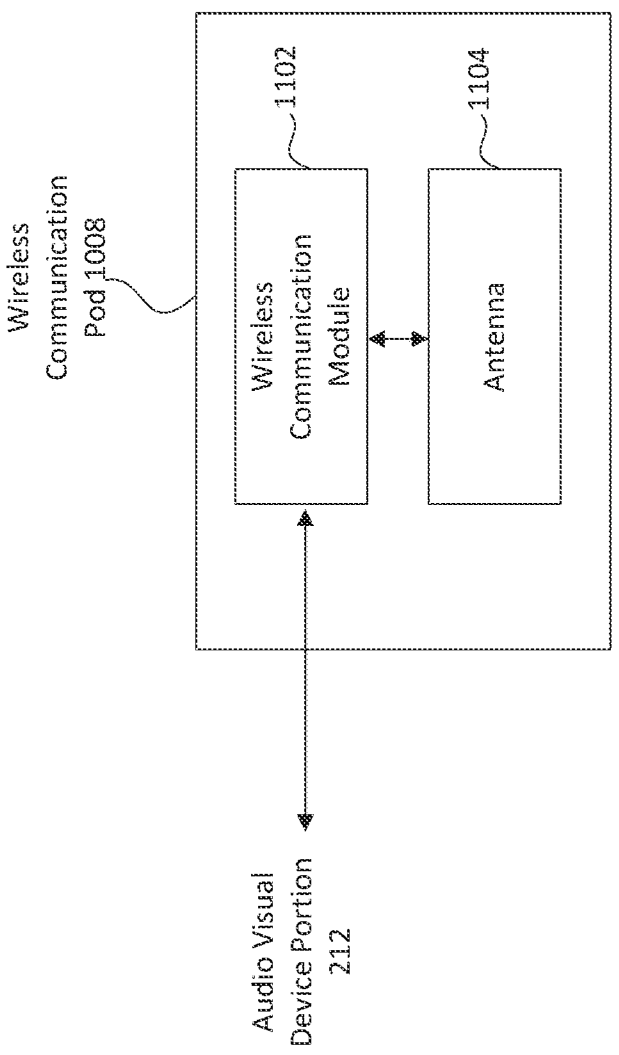
FIG. 11 is a block diagram of a wireless communication pod, according to some embodiments.

As shown in FIG. 11, in some embodiments, the wireless communication pod 1008 may include a wireless communication module 1102 and an antenna 1104. The wireless communication module 1102 may be configured to enable and perform wireless connectivity and communication using antenna 1104 (and/or any external antennas, as discussed herein with respect to FIG. 1 for example) according to any wireless communication standard, methodology or technology, including but not limited to any WIFI, cellular and/or short range communication standard, methodology or technology.

Referring back to FIG. 10, in some embodiments, the audio-visual device portion 212 maybe connected to cable portion 1002 via port 210 and connector 1004. Connector 208 may be inserted into an HDMI port of a television (or other display device), and USB connector 1010 may be inserted into an USB port of the television. The embodiment of FIG. 10 is advantageous because the wireless communication pod 1008 is generally not noticeable to users (that is, it is generally hidden from users), since it is combined with or part of the USB connector 1010. But, the embodiment of FIG. 10 may suffer from degraded wireless communication performance since the wireless communication pod 1008 is located close to the television (which may be the source of noise) when the USB connector 1010 is connected to the television.

Figure 12:
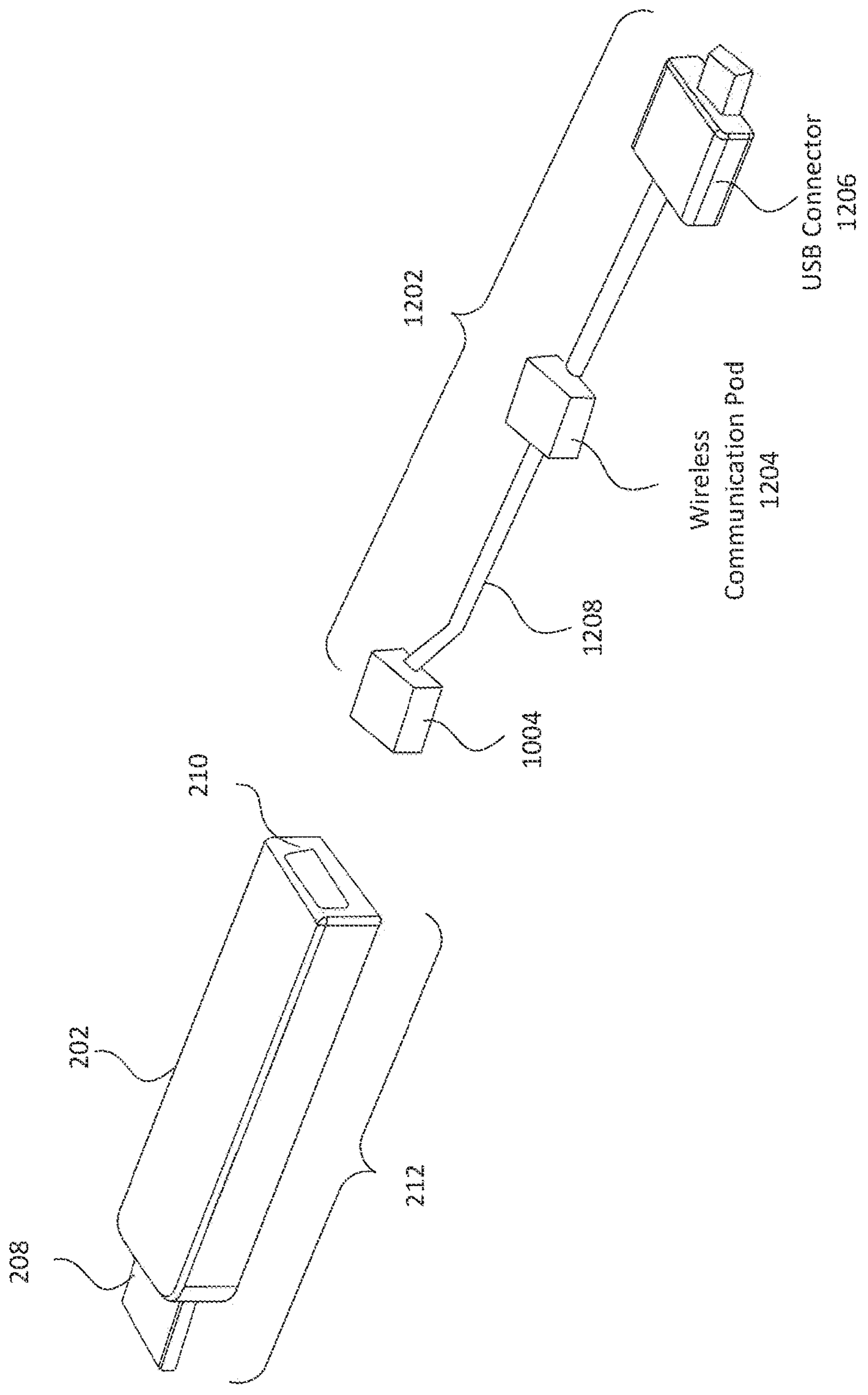

FIG. 12 illustrates an example streaming media device 1200 having audio-visual device portion 212 and cable portion 1202, according to some embodiments. FIG. 12 is generally similar to FIGS. 2 and 10. However, in the example of FIG. 12, cable portion 1202 includes a wireless communication pod 1204 that is integrated with cable 1208 and located away from USB connector 1206 and connector 1004.

The wireless communication pod 1204 may be similar in structure and operation to wireless communication pod 1008 shown in FIG. 11.

In some embodiments, the audio-visual device portion 212 may be connected to cable portion 1202 via port 210 and connector 1004. Connector 208 may be inserted into an HDMI port of a television (or other display device), and USB connector 1206 may be inserted into an USB port of the television. Because wireless communication pod 1204 is located away from both connector 1004 and USB connector 1206, wireless performance is enhanced because wireless communication pod 1204 is not located close to the television, which may be the source of noise, even when connectors 208 and 1206 are inserted into respective ports of the television.

In an embodiment, wireless communication pod 1204 may be positioned in cable 1208 equal distance, or substantially equal distance, from connector 1004 and USB connector 1206. In another embodiment, wireless communication pod 1204 may be offset from connector 1004 and USB connector 1206 in cable 1208 by different distances, but sufficiently away from either connector 1004, connector 208 or USB connector 1206 to reduce wireless communication interface due to noise from the television.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A cable for use with a streaming media device, the cable comprising:

a supply line configured to carry at least one of power and data;

a first antenna;

a second antenna, wherein the first antenna and the second antenna are linearly offset from each other; and a connection portion coupled to the supply line, the first antenna, and the second antenna, wherein the connection portion comprises an antenna connector that is electrically coupled to the first antenna and to the second antenna and a supply connector that is electrically coupled to the supply line, and wherein the connection portion is configured to detachably connect the antenna connector and the supply connector to the streaming media device.

2. The cable of claim 1, wherein the connection portion further comprises a second antenna connector that is electrically coupled to the second antenna, and wherein the connection portion is further configured to detachably connect the second antenna to the streaming media device.

3. The cable of claim 1, wherein the antenna connector is a male connector.

4. The cable of claim 1, wherein the antenna connector is a coaxial connector.

5. The cable of claim 1, wherein the supply connector is a male Universal Serial Bus (USB) connector.

6. The cable of claim 1, wherein the supply connector is a male High-Definition Multimedia Interface (HDMI) connector.

7. The cable of claim 1, wherein the supply connector is a micro-Universal Serial Bus (USB) connector.

8. The cable of claim 1, wherein the connection portion is implemented as a single modified standard Universal Serial Bus (USB) connector, and wherein the single modified standard USB connector comprises the antenna connector.

9. The cable of claim 1, wherein the first antenna and the second antenna are linearly offset from each other within the cable by a predetermined distance.

10. The cable of claim 9, wherein the predetermined distance is equal to a fraction of a wavelength of a carrier signal frequency of the cable.

11. The cable of claim 10, wherein the carrier signal frequency is 2.4 GHz and the wavelength is 12.5 centimeters.

12. The cable of claim 11, wherein the fraction is ¼ and the predetermined distance is 31.25 millimeters.

13. The cable of claim 10, wherein the carrier signal frequency is 5 GHz and the wavelength is 5.08 centimeters.

14. The cable of claim 9, wherein the predetermined distance is equal to a multiple of a wavelength of a carrier signal frequency of the cable.

15. The cable of claim 14, wherein the carrier signal frequency is 2.4 GHz and the wavelength is 12.5 centimeters.

16. The cable of claim 14, wherein the carrier signal frequency is 5 GHz and the wavelength is 6 centimeters.

17. The cable of claim 1, wherein the supply line is configured to supply power via the supply connector to the streaming media device.

18. The cable of claim 1, wherein the supply line is configured to supply a data signal via the supply connector to the streaming media device.

19. The cable of claim 1, wherein the supply line is configured to supply a combination of power and a data signal via the supply connector to the streaming media device.

* * * * *